United States Patent [19]
Yasui

[11] Patent Number: 5,144,913
[45] Date of Patent: Sep. 8, 1992

[54] COLLAR AND CLOTHES FOR ANIMALS

[76] Inventor: Ryuzaburo Yasui, 11-15, Kourigaoka 8-chome, Hirakata City, Osaka, 573, Japan

[21] Appl. No.: 560,630

[22] Filed: Jul. 31, 1990

[30] Foreign Application Priority Data

Dec. 18, 1989 [JP] Japan .................................. 1-328683

[51] Int. Cl.$^5$ .............................................. A01K 27/00
[52] U.S. Cl. ..................... 119/106; 119/143; 54/79.4
[58] Field of Search ................. 119/106, 143, 156; 54/79

[56] References Cited

U.S. PATENT DOCUMENTS

| | | | |
|---|---|---|---|
| 4,047,505 | 9/1977 | McAndless | 119/156 |
| 4,068,624 | 1/1978 | Ramney | 119/106 |
| 4,091,766 | 5/1978 | Colliard | 119/106 |
| 4,224,901 | 9/1980 | Carey, Jr. | 119/106 |
| 4,225,578 | 9/1980 | von Bittera et al. | 119/156 |
| 4,378,226 | 3/1983 | Tomibe et al. | 427/121 |
| 4,960,077 | 10/1990 | Lapidus et al. | 119/106 |
| 4,967,698 | 11/1990 | Kennedy | 119/106 |

FOREIGN PATENT DOCUMENTS 0060449  9/1982  European Pat. Off. ............... 54/79

Primary Examiner—Gene Mancene
Assistant Examiner—Frank A. LaViola
Attorney, Agent, or Firm—Armstrong, Nikaido, Marmelstein, Kubovcik & Murray

[57] ABSTRACT

The present invention provides a collar and clothes for animals having at least one side face which contacts the animal's fur or skin, which comprises an acrylic fiber and/or a nylon fiber having copper sulfide absorbed therein. This invented collar or clothes has a deodorant effect on the animal's body smell, bad breath and otorrhoea smell when animals put it on, and the deodorant effect is continuous as long the animals have one on. Further the inventor found that the collar or the clothes is safe for animals.

8 Claims, 4 Drawing Sheets

5,144,913

COLLAR AND CLOTHES FOR ANIMALS

INDUSTRIAL FIELD OF THE INVENTION

The present invention relates to a collar and clothes for animals, and an object of the invention is to provide a collar and clothes for animals capable of easily, continuously and safely deodorizing body smell, bad breath, otorrhoea smell or the like when animals put on this invented collar and clothes.

DESCRIPTION OF THE PRIOR ART

Heretofore, pets kept in a house have the peculiar body smell of their own, which indirectly makes men avert from animals.

Up to today, as a deodorant measure from such body smell of the pet animals, especially well-known dogs, cats, etc., only washing the animal's body has been prevalently practiced.

However, the drawbacks of washing the animal's body does not continue the deodorant effect for long term and frequent washing, which is time-consuming work, is needed for pets having a strong body smell.

Further, because of frequent washing, ingredients of shampoo or the like used for washing the pets inevitably remain in their body hair, and cause a problem in that they act as an allergen for the pet's skin, hence this method is not suitable in view of the pet animal's health.

Another deodorant measure to eliminate the pet animal's body smell is masking such by spraying a fragrant on to the pet animal's body.

However, this measure does not have a perfect effect for deodorizing the animal itself and is not of practical use for its temporary deodorant effect.

Despite the ardent demand to deodorize bad breath and otorrhoea smell of animals among pet-lovers, an effective measure to do so has been not yet been found.

PROBLEMS TO BE SOLVED BY THE INVENTION

In view of the prior arts, it has been desired to find a way to deodorize not only the body smell but also bad breath, otorrhoea smell of dogs, cats or the like animals easily, continuously and safely.

BRIEF DESCRIPTION OF THE DRAWINGS

FIG. 1 (B) is a sectional view taken on line A—A of FIG. 1 (A).

FIG. 1 (C) and (D) are explanatory view of the collar for animals in use.

FIG. 3 (B) is a sectional view taken on line B—B of FIG. 3 (A).

FIG. 3 (C) is an explanatory view of accessory ring for animals showed in FIG. 3 (A) in use.

FIG. 4 (A) is a plan view showing the surface of cloth for animals to touch in contact with.

FIG. 4 (B) is an explanatory view of clothes for animals of FIG. 4 (A) in use.

EMBODIMENTS OF THE INVENTION

Figure 1A:
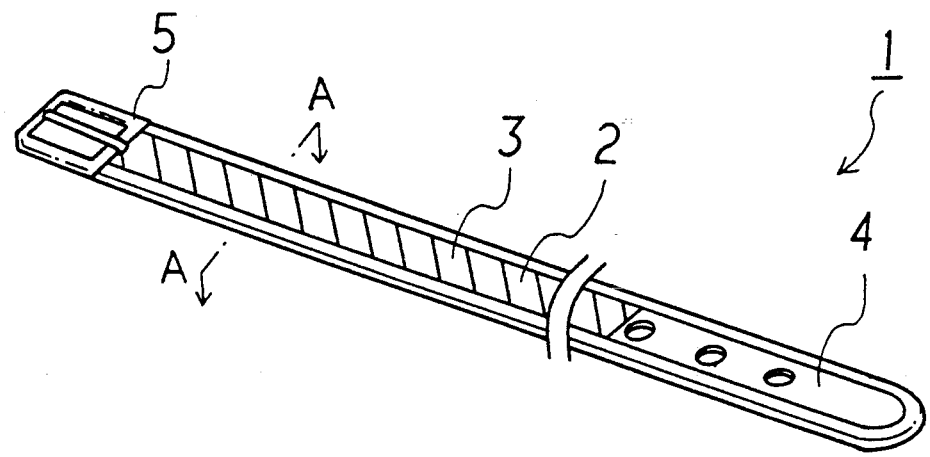
FIG. 1 (A) is a perspective vie showing one of the embodiments of the collar for animals according to the invention.

The embodiment of the invention will be described below in detail referring to the drawings.

FIG. 1 (A) is a perspective view showing one of the embodiments of the collar according to the invention.

(1) is the collar for the animals, (2) is the acrylic fiber and/or nylon fiber having absorbed copper sulfide therein, (3) is a cloth made of acrylic fiber and/or nylon fiber having copper sulfide (2) absorbed therein.

(4) is a base material of the collar for animals and (5) is a buckle.

Figure 1B:
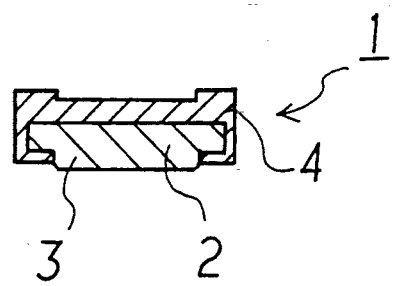

FIG. 1(B) is a section view taken along the line A—A of FIG. (A), FIG. 1 (C) and (D) are explanatory views of the collar for animals in use.

The collar for animals (1) of the invention includes a common use leash, a discrimination ring, and/or a ring around the neck, body, leg, etc.

Specific examples of collars used like a ring is an accessory ring for animals to be described later in Modification Example.

The acrylic fiber and/or nylon fiber having absorbed copper sulfide (2) relating to the invention will be described in detail.

The fabric 3 is prepared from an acrylic fiber and/or nylon fiber (2) having copper sulfide absorbed therein and is usually produced by treating an acrylic fiber and/or nylon fiber having absorbed monovalent copper ion (including modacrylic fiber) with a reducing aqueous solution containing hydrosulfite or a hydrosulfite-like substance.

Any copper sulfide can be used in the invention without specific limitation with respect to the copper sulfide.

Specific examples are thiocuprate like potassium copper sulfide, sodium copper sulfide, and copper sulfide or copper sulfide produced by the reaction of a dithionite, like sodium dithionite, with copper ions.

The acrylic fiber can be any of those being capable of absorbing said copper sulfide and preferred examples thereof are ones having in the component acrylonitrile, methacrylonitrile, etc. in the fiber unit which contains CN groups to which can easily absorb copper ions.

Any nylon fiber can be used because its main functional group, amide, easily adsorbs copper ions.

The fiber (2) is usually prepared into thread and the thread is further prepared into the cloth (3) for use.

The embodiment of the invention includes not only the fiber (2) but also the thread from the fiber (2) and the cloth (3) from thread.

In the example as FIG. 1, it is preferable that the fiber (2) is prepared into the cloth (3), thereafter the cloth (3) is attached to the base material of the collar for animals (4).

The form or type of the cloth (3) to be used in the invention is not specifically limited, however it is preferable to use a non woven fabric.

The cloth (3) is attached to a base material of a collar for animals (4) by adhering with an adhesive agent, sewing or the like.

The cloth (3) must be attached at least on the face of a base material (4) to contact with animals when animals put on the collar.

A deodorant effect of the collar for animals (1) can not be expected in the case that the cloth (3) doesn't touch with animals.

The reason why a deodorant effect is shown by the collar for animals (1) having attached the cloth (3) is not clear, however the present inventor speculates that the fiber (2) possesses a preventive effect of static electricity and antibacterial effect therefore an deodorant effect is expected by using the collar for animals (1).

Namely, adhesions of dirt and unwanted bacteria which causes body smell by decomposing skin fat components and matebolites are prevented by the preventive effect of static electricity.

Further this preventive effect of static electricity also prevents a tangle of body hair, therefore unwanted bacteria and dirt are in no condition to adhere for animal's body hair itself; that is, a double effect is produced.

Furthermore, adhering unwanted bacteria are decreased without breeding by the antibacterial effect of the fiber (2), so a deodorant effect is obtained.

A base material of the collar for animals (4) to be favorably used is a material used as a collar for animals generally i.e., synthetic resin, synthetic fiber, natural fiber, leather, synthetic leather, or the like, and an acrylic fiber and/or nylon fiber having absorbed copper sulfide.

Figure 1C:
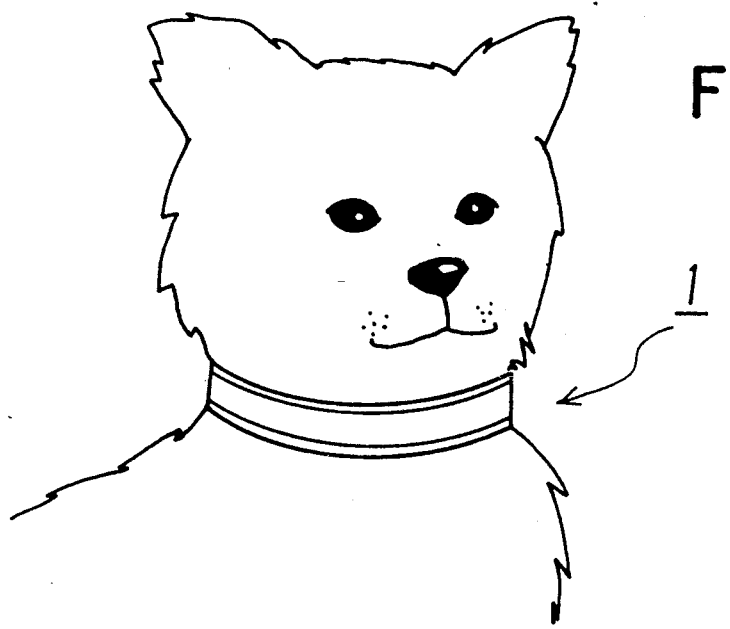
Figure 1D:
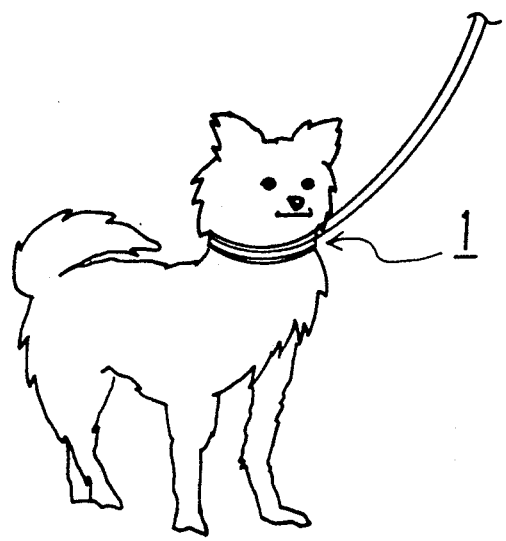

The collar for animals (1) like the above structure is worn by using a buckle as showed in FIG. 1(C) and (D), at the time the cloth (3) processed from an acrylic fiber and/or nylon fiber having absorbed copper sulfide (2) must be contacted with the animal.

This invented collar for animals (1) can be equipped with a chain and a thong to use in a walk or for tying, therefore this collar (1) has a function the same as a standard collar.

And animals wearing this inventional collar for animals (1) are able to live their usual life without hindrance.

Figure 2:
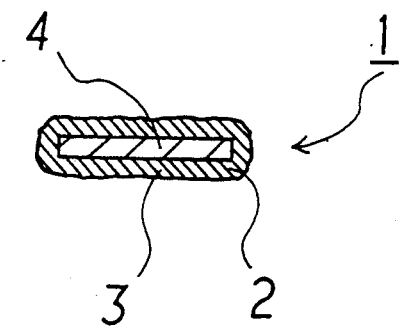
FIG. 2 is a section view of a first modification example relating to collar for animals of FIG. 1.

FIG. 2 is a sectional view of the first modification example shown in FIG. 1 relating to this invented collar for animals (1).

In a word, FIG. 2 is a section view of a collar for animals (1) whose base material (4) is covered all over with the cloth (3) processed from an acrylic fiber and-/or nylon having copper sulfide absorbed therein.

Figure 3A:
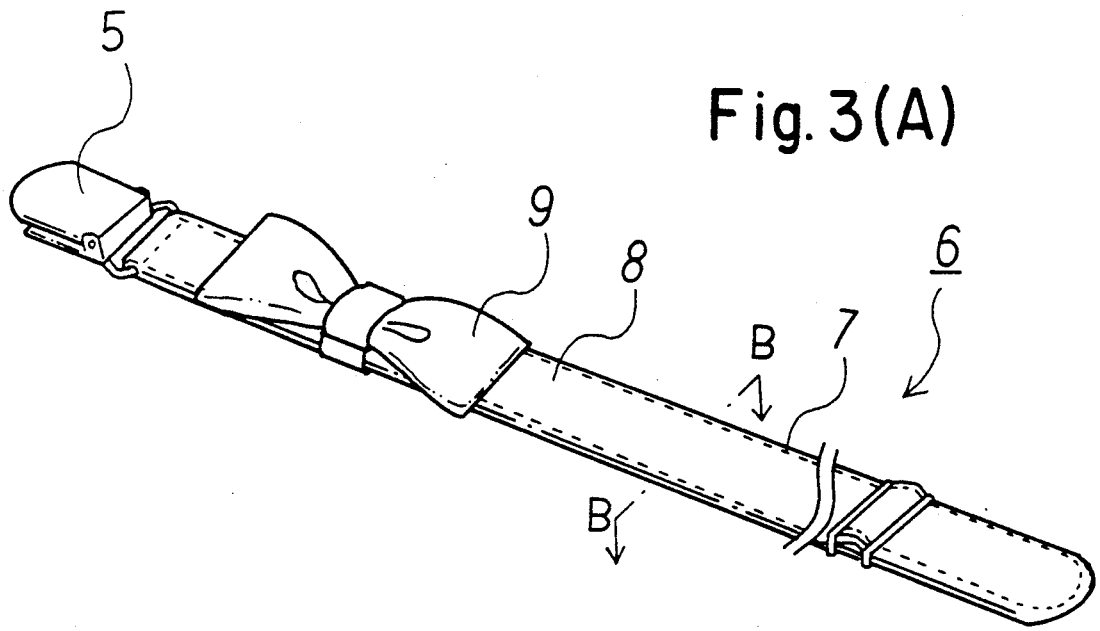
FIG. 3 (A) is an perspective illustration of an accessory ring for animals which is the second modification example relating to this invented collar for animals of FIG. 1.
Figure 3B:
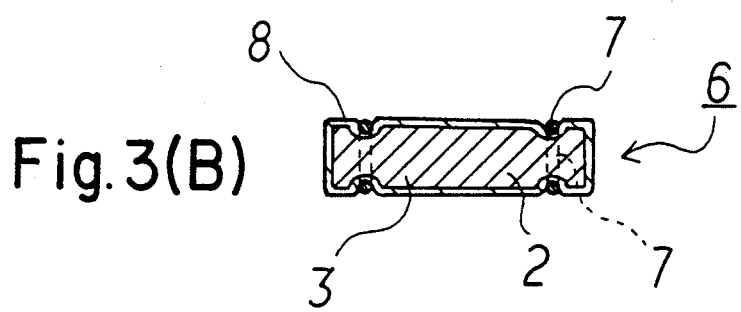
Figure 3C:
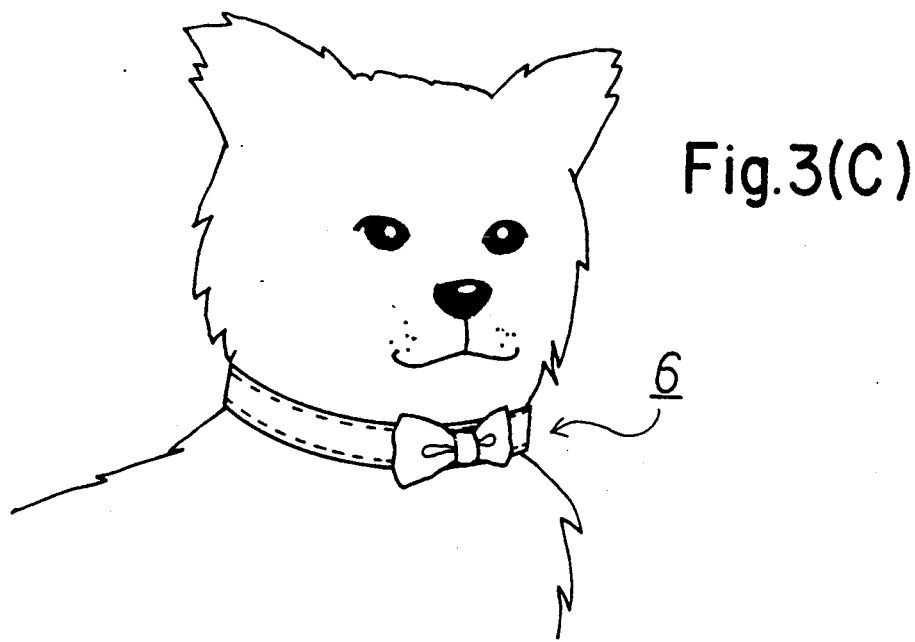

FIG. 3 (A) is perspective illustration of an accessory ring for animals which is the second modification example relating to this invented collar for animals (1) of FIG. 1.

FIG. 3 (B) is a section view taken on line B—B of FIG. 3 (A).

FIG. 3 (C) is explanatory view of an accessory ring for animals shown in FIG. 3 (A) in use.

(6) is an accessory ring for animals, (7) a thread made from an acrylic fiber and/or nylon fiber having absorbed copper sulfide (2).

(8) is a base material of accessory ring for animals, (9) accessory ribon.

This invented accessory ring (6) is used by forming a ring around the neck, body, leg, etc.

In the accessory ring (6) corresponding to the second modification example, the cloth (3) is attached to the internal parts of basematerial of accessory ring (8) and it is sewed by using a thread.

The reason why the cloth (3) is sewed by using a thread (11) is to gain a deodorant effect induced from the preventive effect of static electricity showed by lying between a thread (7) and the cloth (3) which is attached to the internal parts of base material.

This invented base material of accessory ring for animals (8) to be favorably used is general fiber i.e., cotton, silk and synthetic fibers or the like.

Further this invented accessory ring for animals (6) is not limited as shown in FIG. 3, it can make use of other optical structure accessory ring such as the cloth (3) and an accessory ribbon are attached to general fiber like synthetic resin, leather, synthetic leather, cotton and synthetic fibers or an acrylic fiber and/or nylon fiber having absorbed copper sulfide.

Figure 4A:
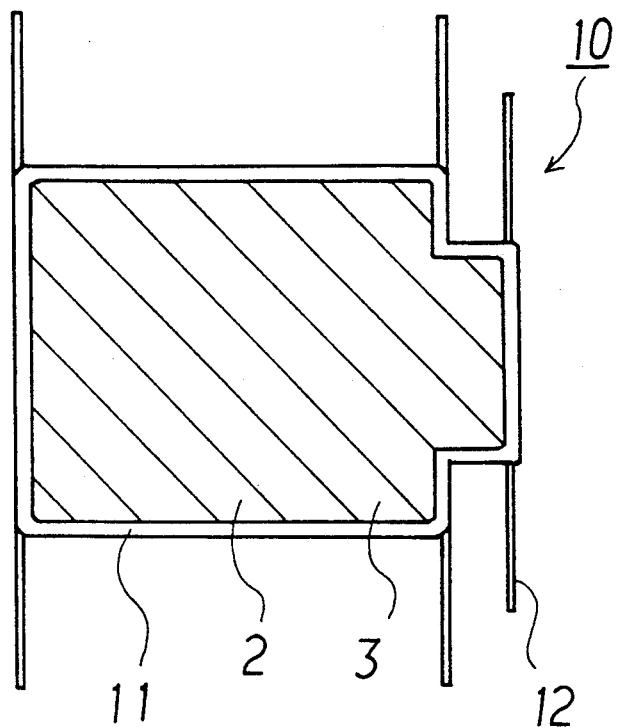
Figure 4B:
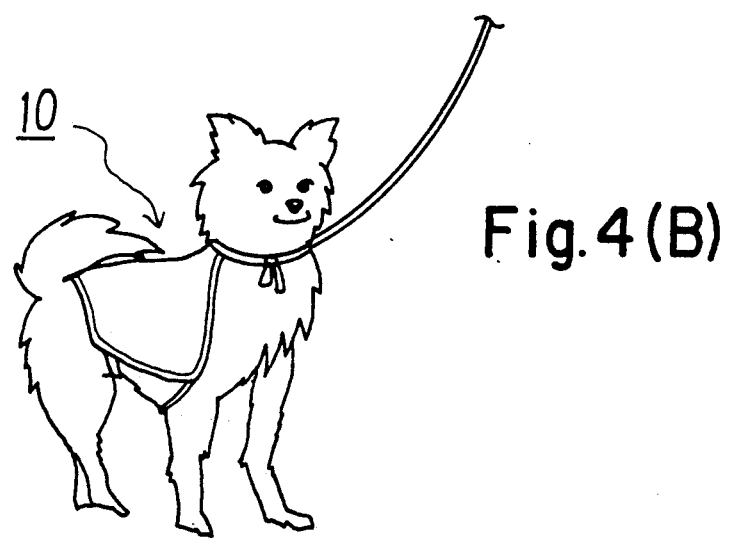

FIG. 4 (A) is a plan view showing the face in clothes for animals touch contact with.

FIG. 4 (B) is an explanatory view of clothes for animals of FIG. 4 (A) in use.

(10) is the clothes for animals, (2) the acrylic fiber and/or nylon fiber having absorbed copper sulfide, (3) the cloth made from acrylic fiber and/or nylon fiber having absorbed copper sulfide, (11) a base material of clothes to animals and (12) a cord for put on and take off.

The clothes for animal (10) in this invention include not only clothes which animals put on usually but also accessories.

Specific examples are a sweater for animals, a vest for animals and a ribbon for animals.

A type of the cloth (3) to be used in this invented clothes for animals (10) is not specifically limited, however the cloth (3) must be attached at least on the face of base material (11) to contact with the animal when animals put on this clothes for animals (10). A deodorant effect of the clothes for animals (10) cannot be expected where the cloth (3) does not touch the animal's body.

A base material of animals (11) to be favorably used is synthetic fibers, cotton, hemp, etc., and an acrylic fiber and/or nylon fiber prepared with absorbed copper sulfide.

The way of wearing this clothes for animals (10) is normal.

And animals are able to live usual life without hindrance while animals put on this clothes for animals (10).

The invention will be described in more detail with reference to the following test examples and comparative examples.

TEST EXAMPLE 1

A collar for animals was made by sewing together synthetic leather (40 cm in length and 1.5 cm in width of cut) and a cloth (acrylic fiber containing absorbed copper sulfide, brand name "thunderlon SS-N" made by Nihon Sanmo Dyeing Co., Ltd., Japan, polyacrylnitrile-copper sulfide complex of specific resistance $5.85 \times 10^{-1} \omega 5.85 \times 10^{-2}$ Ωcm, 28 cm in length, 0.7 cm in width and 3 mm in thickness of cut).

37 dogs {Pomeranian, Yorkshireterrier, Maltese, Poodle, Shih Tzu, Shelty, Japanese dog, crossbreed dogs etc., (weight 3~6 Kg) and a crossbreed dog (weight 12 Kg), a German sheperd (weight 30 Kg)} were made to wear the above clothes for animals, then the deodorant effect of the collar with respect to body smell was examined.

The body smell of testees was measured by using a sensual test 3, 7, 15, 30 days after wearing this invented collar for animals.

Table 1 shows the number of testees (dogs) which showed confirmed deodorant effect.

TEST EXAMPLE 2

35 dogs having bad breath; {Pomeranian, Yorkshireterrier, Maltese, Poodle, Shih Tzu, Shelty, Japanese dog, crossbreed dogs etc., (weight 3~6 Kg) and a crossbreed dog (weight 12 Kg)} were made to wear the collar for animals prepared in the same manner as in example 1, then the deodorant effect to their bad breath was examined.

Bad breath of testee is measured by using a sensual test 3, 7, 5, 15, 30 days after wearing this invented collars for animals.

In table 1 shows the number of testees (dogs) in which the deodorant effect was confirmed.

TEST EXAMPLE 3

19 dogs having otorrhoea smell: {Pomeranian, Yorkshireterrier, Maltese, Poodle, Shih Tzu, Shelty, Japanese dog, crossbreed dogs etc. (weight 3~6 Kg), and a German sheperd (weight 30 Kg)} were made to wear the collar for animals prepared in the same manner as in example 1, then the deodorant effect to smell discharged from the ears was examined.

A otorrhoea smell was measured by using sensual test 3, 7, 5, 15, 30 days after wearing this invented collar for animals.

In table 1 shows the number of testee (dogs) confirmed with deodorant effect.

COMPARATIVE EXAMPLE 1

A collar for animals was prepared by using the same synthetic leather as example 1 (40 cm in length and 1.5 cm in width of cut), (no stitching an acrylic fiber adsorbing copper sulfide (brand name "thunderlon SS-N", made by Nihon Sanmo Dyeing Co., Ltd., Japan, polyacrylnitrile-copper sulfide complex of specific resistance $5.85 \times 10^{-1} \sim 5.85 \times 10^{-2}$ $\omega$cm).

The same testees as example 1 were measured by using the above collars for animals in the same manner as in example 1.

In table 2 shows the test result.

COMPARATIVE EXAMPLE 2

The same testes as example 2 were examined in the same manner as example 2 by using the same collars for animals as comparative example 1.

In table 2 shows the test result.

COMPARATIVE EXAMPLE 2

The same testees as example 3 were examined in the same manner as in example 3 by using the same collars for animals as comparative example 1.

In table 2 shows the test result.

TABLE 1

|  | 3 days | 7 days | 15 days | 30 days | no effect |
|---|---|---|---|---|---|
| body smell | 18 | 30 | 34 | 37 | 0 |
| bad breath | 12 | 26 | 30 | 30 | 5 |
| otorrhoea smell | 4 | 10 | 15 | 16 | 3 |

TABLE 2

|  | 3 days | 7 days | 15 days | 30 days | no effect |
|---|---|---|---|---|---|
| body smell | 0 | 0 | 0 | 0 | 37 |
| bad breath | 0 | 0 | 0 | 0 | 35 |
| otorrhoea smell | 0 | 0 | 0 | 0 | 19 |

TEST EXAMPLE 4

(a); a cloth consist of 100% acrylic fiber.

(b); a cloth consist of acrylic fiber as example 1 (80%) and acrylic fiber prepared by adsorption of copper sulfide (20%) (brand name "thunderlon SS-N", made by Nihon Sanmo Dyeing Co., Ltd., Japan, polyacrylnitrile-copper sulfide complex of specific resistance $5.85 \times 10^{-1} \sim 5.85 \times 10^{-2}$ $\omega$cm).

A frictional voltage between these (a), (b) and cotton cloth is measured (by using JIS.L-1094).

In table 3 shows this result.

TABLE 3

|  | voltage |
|---|---|
| (a) | 4500 V |
| (b) | 94 V |

TEST EXAMPLE 5

(c) the cloth consist of acrylic fiber (brand name "thunderlon SS-N", made by Nihon Sanmo Dyeing Co., Ltd., Japan, polyacrylnitrile-copper sulfide complex of specific resistance $5.85 \times 10^{-1} \sim 5.85 \times 10^{-2}$ $\omega$cm).

(d) the cloth consist of nylon fiber (brand name "nylonthunderlon" made by Nihon Sanmo Dyeing Co., Ltd., Japan).

The antibacterial test was carried out by using (c), (d) and (c), (d) which were washed 10 times.

As test bacteria *Staphylococus aureus* ①, *Klebslella pneumoniae* ② were used.

The method was used by the method of shake-flask.

THE TABLE 4

| Sample | ① bacteria decreased rate | ② bacteria decreased rate |
|---|---|---|
| (c) original cloth | more than 99% | more than 99% |
| after 10 times washing | 98% | more than 99% |
| (d) original cloth | more than 99% | more than 99% |
| after 10 times washing | 96% | more than 99% |
| * original cloth | 8% | 25% |

* notice) As comparison, standard white cloth (nylon) was used.

EFFECT OF THE INVENTION

The present invention provide a collar and clothes for animals which are at least contacting with animal's side face of comprising of an acrylic fiber and/or nylon fiber adsorbing copper sulfide, therefore as described in above test examples and comparative examples this collar or the clothes for animals capable of easily and continuously deodorizing body smell, bad breath and a otorrhoea or the like when dogs or the like animals put on it.

Moreover, this inventional acrylic fiber and/or nylon fiber absorbing copper sulfide is confirmed by skin test that this fiber is seminegative; excite index 2B, 0D, 0C. (Japanese Industrial Skin Hygiene Society, KAWAI Industrial Medical Laboratory).

Accordingly, this inventional collar and clothes for animals are safe.

What is claimed is:

1. A collar for animals which comprises a base material and cloth made of at least one of an acrylic fiber and a nylon fiber containing absorbed copper sulfide, said cloth being attached to said base material at least on the side thereof which contacts an animal's face, and wherein said cloth has been made by absorbing copper ion thereinto and then treating such with a reducing aqueous solution containing hydrosulfite.

2. A collar for animals as set forth in claim 1, wherein said at least one of an acrylic fiber and a nylon fiber is produced by treating said at least one of an acrylic fiber and a nylon fiber containing absorbed monovalent copper ion with a reducing aqueous solution containing a hydrosulfite.

3. Clothes for animals having at least on the face thereof adapted to contact said animal with a cloth comprising at least one of an acrylic fiber and a nylon fiber containing absorbed copper sulfide, said cloth being attached to said base material at least on the side thereof which contacts an animal's face, and wherein said cloth has been made by absorbing copper ion thereinto and then treating such with a reducing aqueous solution containing hydrosulfite.

4. Clothes for animals as set forth in claim 3, wherein said at least one of an acrylic fiber and a nylon fiber is produced by treating said at least one of an acrylic fiber and a nylon fiber containing adsorbed monovalent copper ion with a reducing aqueous solution containing hydrosulfite.

5. A collar for animals as set forth in claim 1 wherein said acrylic fiber is a modacrylic fiber.

6. Clothes for animals as set forth in claim 3 wherein said acrylic fiber is a modacrylic fiber.

7. A method of deodorizing animals which comprises juxtaposing a cloth comprising at least one of an acrylic and a nylon fiber having copper sulfide absorbed therein to the skin of said animal.

8. A method as claimed in claim 7 wherein said acrylic is a modacrylic.

* * * * *